Patented May 20, 1941

2,242,301

UNITED STATES PATENT OFFICE 2,242,301

COLORING MATTER OF THE PHTHALOCYANINE TYPE

Isidor Morris Heilbron, London, Francis Irving, Manchester, and Reginald Patrick Linstead, Sheffield, England, assignors to Imperial Chemical Industries Limited, a corporation of Great Britain No Drawing. Application May 14, 1936, Serial No. 79,813, which is a division of application Serial No. 698,216, November 15, 1933. Divided and this application October 6, 1938, Serial No. 233,602. In Great Britain November 16, 1932

4 Claims. (Cl. 260—314)

This application relates to coloring matters of the phthalocyanine series, and constitutes a division of our copending application Serial No. 79,813, filed May 14, 1936, (Patent No. 2,166,213, issued July 18, 1939) which in turn is a division of our former application Serial No. 698,216, filed November 15, 1933, and issued May 10, 1938, as Patent No. 2,116,602.

It is an object of this invention to provide an improved process for the manufacture of coloring matters of the phthalocyanine series, especially those which contain combined copper, and which will hereinafter be referred to as copper phtalocyanines. It is a further object of this invention to provide a process for the production of copper phthalocyanines which leads to a product of high purity. It is a further object of this invention to produce copper phthalocyanines of extremely high quality, and which are superior in chemical purity and coloring properties to the product obtainable by heating phthalic anhydride or phthalimide in the presence of copper compounds. Other and further important objects of this invention will appear as the description proceeds.

In British patent Specification No. 322,169 there is described a process for the production of blue to green coloring matters by heating phthalic anhydride with ammonia and certain metals or metal compounds including iron, cuprous chloride and nickel sulphide. In British patent Specification No. 389,842 (corresponding to U. S. Patent No. 2,000,051) there is described a process for the production of nitrogen-containing coloring matters of complex constitution which comprises heating a o-cyanoarylcarboxyamide in the presence of specified metals and metal compounds. These coloring matters are described as purple to green in color and stated to appear to belong to one general class, this class appearing to include the said coloring matters of British patent Specification No. 322,169. British patent Specification No. 389,842 also describes the production of metal-free coloring matters and gives probable formulae for a coloring matter containing magnesium and the corresponding metal-free coloring matter.

British patent Specification No. 390,149 (corresponding to U. S. Patent No. 2,000,052) describes the production of the same coloring matter containing magnesium and the corresponding metal-free coloring matter and of substituted derivatives of these by heating a phthalimide with ammonia and magnesium or antimony.

We have now found that coloring matters of the same general series, but of improved properties, can be obtained by heating an o-arylene dicyanide, for instance phthalonitrile, with copper or copper compounds in the absence of a base or in the absence of any solvent whatever.

We have also found that substituted phthalonitriles and o-dinitriles of naphthalene and anthracene may be used instead of phthalonitrile. The so-obtained coloring matters are typically blue to green in shade, have only slight solubility in organic solvents, but dissolve in concentrated sulfuric acid and are decomposed by nitric acid. They contain nitrogen, are of complex constitution and contain copper in combined form. Their typical constitution is illustrated by the compound derived from phthalonitrile, which corresponds to the empirical formula $(C_8H_4N_2)_4Cu$, and has a structure which is most probably represented by the following formula:

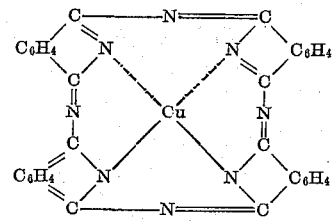

It will be understood, however, that the above formula is not limitative, and does not exclude the possibility of other, especially tautomeric, arrangements.

The copper-containing coloring matters from substituted phthalonitriles and copper or copper compounds appear to be substituted derivatives of the above. Cupric chloride gives a coloring matter containing chlorine.

Combination is preferably effected by submitting the o-arylene dicyanide to the action of heat in the presence of a cupriferous reagent, such as metallic copper, or cuprous or cupric compounds. Particularly valuable embodiments of this process are the manufacture of coloring matters by heating phthalonitrile with copper or copper compounds in the absence of any solvent whatever or in the presence of a non-basic, high-boiling organic diluent such as naphthalene or alpha-chloro-naphthalene.

Working according to this new process the coloring matters are, generally speaking, formed with greater readiness than according to those of the above-mentioned specifications and higher yields, in some cases nearly the theoretical, are obtained. Purification may be effected as already described in the said specification.

The coloring matters may be employed as pigments. For instance, they may be made into lakes with the usual substrata. Such lakes may be used as coloring matters for varnishes and inks.

The following examples in which parts are by weight illustrate but do not limit the invention.

*Example 1.*—A mixture of 12.8 parts of phthalonitrile and 2.5 parts of cuprous chloride is heated gently in a stream of nitrogen. A vigorous reaction takes place and after a few minutes, the mass becomes almost solid. This mass is allowed to cool, broken and extracted with boiling water. After filtering the residue is boiled successively with dilute acid, and alcohol, filtered after each boiling and finally washed with water and dried. The resulting bright blue pigment appears to possess the same properties as copper-phthalocyanine. It does contain, however, combined chlorine, and apparently consists of a mixture of the copper-phthalocyanine proper, $(C_8H_4N_2)_4Cu$, and of a chlorinated derivative thereof. The latter is more fully identified and claimed in Linstead and Dent's U. S. Patent No. 2,129,013, issued September 6, 1938.

In lieu of copper and cuprous chloride, one may employ cuprous cyanide, cuprous and cupric oxides, cupric sulfide, cupric chloride, cupric acetate and cupric sulfate. Indeed, we believe that any compound of copper which is capable of yielding copper compounds when reacted for instance with an acid will give the copper-phthalocyanine if heated with phthalonitrile at suitable temperatures in a suitable medium. When cupric chloride is used the resulting pigment contains chlorine, but otherwise appears to have the same structure as copper-phthalocyanine.

*Example 2.*—3-nitrophthalonitrile (made from 3-nitrophthalic acid by heating with urea to give the imide, heating this with ammonia to give the diamide, and boiling the diamide with acetic anhydride) and copper bronze are heated to 220° C. in methylnaphthalene. The methylnaphthalene is removed and the residue purified with concentrated sulfuric acid. A good yield of pigment is obtained and this appears to be a tetranitro derivative of the copper compound formulated above. Its empirical formula is therefore $[C_8H_3(NO_2)N_2]_4Cu$.

4-nitrophthalonitrile also readily gives a coloring matter containing copper.

It will be understood that our invention is susceptible of wide variation and modification without departing from the spirit thereof, as defined by the subjoined claims.

We claim:

1. Process for the manufacture of phthalocyanine coloring matters which comprises heating an o-arylene dicyanide and a cupriferous reagent in an inert, non-basic medium, until a solid, bluish to greenish colored compound has been formed.

2. Process for the manufacture of phthalocyanine coloring matters which consists of heating an o-arylene dicyanide and a cupriferous reagent in the presence of an inert, neutral organic solvent for the o-arylene dicyanide, and recovering the pigment thus produced.

3. Process for the manufacture of phthalocyanine coloring matters which comprises heating an o-arylene dicyanide and a cupriferous reagent in a molten medium consisting of a high boiling hydrocarbon, and recovering the pigment thus produced.

4. Process for the manufacture of phthalocyanine coloring matters which consists of heating a nitro-phthalonitrile and copper at a temperature of about 220° C., in an inert organic diluent which is liquid at said temperature, until the formation of a colored solid reaction product, separating the latter from the reaction mass, and purifying the same by reprecipitation from sulfuric acid.

ISIDOR MORRIS HEILBRON.
FRANCIS IRVING.
REGINALD PATRICK LINSTEAD.